United States Patent
Shaw (10) Patent No.: US 9,300,002 B2
(45) Date of Patent: Mar. 29, 2016

(54) THREE-DIMENSIONAL SUPERCAPACITORS AND BATTERIES WITH HIGH ENERGY DENSITIES

(71) Applicant: Leon Shaw, Chicago, IL (US)

(72) Inventor: Leon Shaw, Chicago, IL (US)

(73) Assignee: Illinois Institute of Technology, Chicago, IL (US)

(*) Notice: Subject to any disclaimer, the term of this patent is extended or adjusted under 35 U.S.C. 154(b) by 404 days.

(21) Appl. No.: 13/782,409

(22) Filed: Mar. 1, 2013

(65) Prior Publication Data

US 2013/0230751 A1    Sep. 5, 2013

Related U.S. Application Data

(60) Provisional application No. 61/606,397, filed on Mar. 3, 2012.

(51) Int. Cl.

| | | |
|---|---|---|
| *H01M 4/70* | (2006.01) | |
| *H01M 10/04* | (2006.01) | |
| *H01G 11/04* | (2013.01) | |
| *H01G 11/12* | (2013.01) | |
| *H01M 4/13* | (2010.01) | |
| *H01M 10/052* | (2010.01) | |
| *H01M 10/058* | (2010.01) | |
| *H01M 4/02* | (2006.01) | |

(52) U.S. Cl.
CPC ............... *H01M 10/04* (2013.01); *H01G 11/04* (2013.01); *H01G 11/12* (2013.01); *H01M 4/13* (2013.01); *H01M 10/052* (2013.01); *H01M 10/058* (2013.01); *H01M 2004/025* (2013.01); *Y02E 60/13* (2013.01); *Y02T 10/7022* (2013.01); *Y10T 29/417* (2015.01); *Y10T 29/49115* (2015.01)

(58) Field of Classification Search
CPC .................................................. H01M 2004/025
USPC .................................................. 429/72, 233
See application file for complete search history.

(56) References Cited

U.S. PATENT DOCUMENTS

2003/0099884 A1*    5/2003    Chiang et al. ................. 429/233

OTHER PUBLICATIONS http://nesscap.com/product/overview.jsp. (2 pages), NESSCAP Ultracapacitors, product overview, web pages printed on May 22, 2013.
J. Wang et al., "Solid Freedom Fabrication of Permanent Dental Restorations via Slurry Micro-Extrusion" (4 pages), J.Am.Ceram. Soc., 2006, v.89[1], pp. 346-349.
J. Wang et al., "Rheological and extrusion behavior of dental porcelain slurries for rapid prototyping applications" (8 pages). Materials Siences & Eng. A, 2005, v.397, pp. 314-321.
J.M. Tarascon et al., "Issues and challenges facing rechargeable lithium batteries" (9 pages), Nature, 2001, v. 414, pp. 359-367.
P. Simon et al., Materials for electrochemical capacitors (10 pages), Nature Materials 2008, v. 7, pp. 845-854.

(Continued)

*Primary Examiner* — Basia Ridley
*Assistant Examiner* — James Erwin
(74) *Attorney, Agent, or Firm* — Pauley Erickson & Kottis (57) ABSTRACT

A three-dimensional electrode architecture for a supercapacitor and/or battery characterized by high power density and high energy density includes at least one negative electrode and at least one positive disposed in an interpenetrating manner. Also disclosed are corresponding or associated three-dimensional supercapacitors or batteries as well as methods for making the same.

22 Claims, 6 Drawing Sheets

(56) References Cited

OTHER PUBLICATIONS

A. Manthiram, "High-Voltage Spinel and Polyanion Cathodes" (20 pages), presentation (ES051), DOE Hydrogen & Fuel Cell Prog. & Vehicle Tech. Program Ann. Merit Rev. Mtg., Arlington, VA May 14-18, 2012.

J. Zhang et al., "Development of Si-based High Capacity Anodes" (20 pages), presentation ES144, DOE Hydrogen & Fuel Cell Prog. & Vehicle Tech. Program Ann. Merit Rev. Mtg., Arlington, VA, May 14-18, 2012.

Y. Yao et al., "Interconnected Silicon Hollow Nanospberes for Lithium-Ion Battery Anodes with Long Cycle Life" (6 pages), Nano Letters, 2011, 11(7), pp. 2949-2954.

J. Zhang et al., "High Voltage Electrolyte for Lithium Batteries" (22 pages), DOE Hydrogen & Fuel Cell Prog. & Vehicle Tech. Program Ann. Merit Rev. Mtg., Arlington, VA, May 14-18, 2012.

R. Jow, "High Voltage Electrolyte for Li-ion Batteries" (25 pages), presentation ES024, DOE Hydrogen & Fuel Cell Prog. & Vehicle Tech. Program Ann. Merit Rev. Mtg., Arlington, VA May 14-18, 2012.

B. Dunn et al., "Rethinking Multifunction in Three Dimensions for Miniaturizing Electrical Energy Storage" (5 pages), Interface, Fall 2008, pp. 49-53.

K. Edström, "Electrodeposttion as a Tool for 3D Microbattery Fabrication" (6 pages), Interface, Summer 2011, pp. 41-46.

C. Liu et al., "Graphene-Based Supercapacitor with an Ultrahigh Engergy Density" (6 pages), Nano Letters, 2010, v.10, pp. 4863-4868.

Y. Wang et al., "Supercapacitor Devices Based on Graphene Materials" (5 pages), J. Phys.Chem.C. 2009, v.113, pp. 13103-13107.

M. Stoller et al., "Graphene-Based Uttracapacitors" (5 pages), Nano Letters, 2008, v.8:10, pp. 3498-3502.

D. Yu et al., "Self-Assembled Graphene/Carbon Nanotube Hybrid Films for Supercapacitors" (4 pages), J.Phys.Letters, 2010; v.1, pp. 467-470.

J. Xia et al., "Measurement of the quantum Capacitance of graphene" (5 pages), Nature Nanotechnology, 2009, v. 4, pp. 505-509.

J. Yoo et al., "Ultrathin Planar Graphene Supercapacitors" (5 pages), Nano Letters, 2011, v. 11, pp. 1423-1427.

J. Yan et al., "Preparation of graphene nanosheet/carbon nanotube/polyaniline composite as . . . " (5 pages), J.Power Sources, 2010, v. 195, pp. 3041-3045.

D. Bélanger et al., "Manganese Oxides: Battery Materials Make the Leap . . . " (4 pages), Interface, Spring 2008, pp. 49-52.

L. Athouël et al., "Variation of the MnO2 Birnessite Structure . . . " (8 pages), J.Phys.Chem.C. 2008, v. 112, pp. 7270-7277.

M. Toupin et al., "Charge Storage Mechanism of MnO2 Electrode Used in Aqueous . . . " (7 pages), Chem. Mater., 2004, v. 16, pp. 3184-3190.

V. Subramanian et al., "Nanostructured MnO2: Hydrothermal synthesis and . . . " (4 pages), J.Power Sources, 2006,v. 159, pp. 361-364.

C. Hu et al., "Design and Tailoring of the Nanotubular Arrayed Architecture . . . " (6 pages), Nano Letters, 2006, v. 6:12, pp. 2690-2695.

B. Conway et al., "The role and utilization of pseudocapacitance for energy storage . . . " (14 pages), J. Power Source, 1997, v. 66, pp. 1-14.

J. Park et al., "Improved asymmetric electrochemical capacitor using Zn—Co . . . " (5 pages), Applied Physics A, 2006, v. 82, pp. 593-597.

T. Brousse et al., "Long-term cycling behavior of asymmetric activated carbon/MnO2 . . . " (9 pages), J. Power Sources, 2007, v. 173, pp. 633-641.

A. Yuan et al., "A novel hybrid manganese dioxide/activated carbon supercapacitor . . . " (6 pages), Electrochemistry Comm., 2006, v. 8, pp. 1173-1178.

V. Khomenko et al., "High-voltage asymmetric supercapacitors operating in aqueous electrolyte" (7 pages), Applied Physics A, 2006, v. 82, pp. 567-573.

A. Balducci et al., "The use of ionic liquids as solvent-free green electrolytes . . . " (6 pages), Applied Physics A, 2006, v. 82, pp. 627-632.

W. Pell et al., "Peculiarities and requirements of asymmetric capacitor devices based . . . " (12 pages), J. Power Sources, 2004, v. 136, pp. 334-345.

P. Chen et al., "Inkjet Printing of Single-Walled Carbon Nanotube/RuO2 Nanowire Supercapacitors . . . " (10 pages), Nano Research, 2010, v. 3, pp. 549-603.

P. Simon et al., "Nanstructured Carbons: Double-Layer Capacitance and More" (6 pages), Interface, Spring 2008, pp. 38-43.

Y. Gogotsi et al., "True Performance Metrics in Electrochmical Energy Storage" (2 pages), Science, 2011, v. 334, pp. 917-918.

D. Futaba et al., "Shape-engineerable and highly densely packed single-walled carbon nanotubes . . . " (8 pages), Nature Materials, 2006, v. 5, pp. 987-994.

J. Wang et al., "Fabrication of Functionally Graded Materials Via Inkjet Color Printing" (5 pages), J.Am.Ceram.Soc., 2006, v. 89[10], pp. 3285-3289.

P. Arora et al., "Battery Separators" (44 pages), Chem. Rev., 2004, v. 104, pp. 4419-4462.

T. Brezesinski et al., "Ordered mesoporous α-MoO3 with iso-oriented nanocrystalline walls for thin-film pseudocapacitors" (7 pages), Nature Materials, 2010, v. 9, pp. 146-151.

T. Brezesinski et al., "Templated Nanocrystal-Based Porous TiO2 Films for Next-Generation Electrochemical Capacitors" (8 pages), J.Am.Chem.Soc., 2009, v. 131, pp. 1802-1809.

R. Chandrasekaran et al., "Perparation and electrochemical performance of actived carbon thin films . . . " (7 pages), J.Solid State Electrochem., 2008, v. 12, pp. 1349-1355.

H. Chen et al., "Mechanically Strong, Electronically Conductive and Biocompatible Graphene Paper" (1 page), Advanced Materials, DOI: 10.1002/adma. 200800757—Supporting Info.

J. Chmiola et al., "Monolithic Carbide-Derived Carbon Films for Micro-Supercapacitors" (4 pages), Science, 2010, v. 328, pp. 480-483.

B. Conway et al., "Diagnostic analyses for mechanisms of self-discharge of electrochemical capacitors and batteries" (7 pages), J. of Power Sources, 1997, v. 65, pp. 53-59.

T. Cottineau et al., "Nanostructured transition metal oxides for aqueous hybrid electrochemical supercapacitors" (8 pages), Applied Physics A, 2006, v. 82, pp. 599-606.

S. Devaraj et al., "Effect of Crystallographic Structure of MnO2 on its Electrochemical Capacitance Properties" (12 pages), J.Phys.Chem C., 2008, v. 112, pp. 4406-4417.

A. Du Pasquier et al., "A Comparative study of Li-ion battery, supercapacitor and nonaqueous asymmetric hybrid devices . . . " (8 pages), J. of Power Sources, 2003, v. 115, pp. 171-178.

A. Du Pasquier et al., "Characteristics and Performance of 500 F asymmetric hybrid advanced supercapacitor prototypes" (10 pages), J. of Power Sources, 2003, v. 113, pp. 62-71.

A. Du Pasquier et al., "Power-ion battery: bridging the gap between Li-ion and supercapacitor chemistries" (11 pages), J. of Power Sources, 2004, v. 136, pp. 160-170.

L. Eliad et al., "Assessing optimal pore-to-ion size relations in the design . . . " (7 pages), Applied Physics A, 2006, v. 82, pp. 607-613.

M. El-Kady et al., "Laer Scribing of High-Performance and Flexible Graphene-Based Electrochemical Capacitor" (5 pages), Science, 2012, v. 335, pp. 1326-1330.

W. Gao et al., "Direct laser writing of micro-supercapacitors on hydrated graphite oxide films" (5 pages), Nature Nanotech., 2011, v. 6, pp. 496-500.

M. Hahn et al., "Carbon based double layer capacitors with aprotic electrolyte soulution: the possible role . . . " (6 pages), Applied Physic A, 2006, v. 82, pp. 633-638.

C. Hu et al., "A hierarchical nanostructure consisting of amorphous MnO2, Mn3O4 nanocrystallites, and . . . " (4 pages), J. of Power Sources, 2011, v. 196, pp. 847-850.

K. Hung et al., "Wide-temperature range operation supercapacitors from nanostructured activated carborn fabric" (6 pages), J. of Power Sources, 2009, v. 193, pp. 944-949.

G. John et al., "Design and development of soft nanomaterials from biobased amphiphiles" (6 pages), Soft Matter, 2006, v. 2, pp. 909-914.

(56) References Cited

OTHER PUBLICATIONS

M. Kaempgen et al., "Printable Thin Film Supercapacitors Using Single-Walled Carbon Nanotubes" (5 pages), Nano Letters, 2009, v. 9:5, pp. 1872-1876.

S. Kobayashi et al., "XAFS Study of Reaction Mechanism of Nanosized Manganese Dioxide . . ." (5 pages), Electrochemistry, 2004, v. 72:6, pp. 395-398.

S. Komaba et al., "Electrochemical Insertion of Li and Na Ions into . . ." (6 pages), J. of the Electrochemical Soc., 2010, v. 157(1), pp. A60-A65.

H. Lee et al., "Supercapacitor Behavior with KCl Electrolyte" (4 pages), J. of Solid State Chemistry, 1999, v. 144, pp. 220-223.

K. Lin et al., "Mesoporous $RuO_2$ for the next generation supercapacitors with an ultrahigh power density" (8 pages), Electrochimica Acta, 2009, v. 54, pp. 4574-4581.

Y. Luo, "Preparation of $MnO_2$ nanoparticles by direcctly mixing potassium permanganate and . . ." (3 pages), Materials Letters, 2007, v. 61, pp. 1893-1895.

C. Masarapu et al., "Effect of Temperature on the Capacitance of Carbon Nanotube Supercapacitors" (8 pages), ACS Nano, 2009; v. 3:8, pp. 2199-2206.

J. Miller et al., "Electrochemical Capacitors for Energy Management" (2 pages), Science, 2008, v. 321, pp. 651-652.

J. Miller et al., "Electrochemical Capacitors: Challenges and Opportunities for Real-World Applications" (5 pages), Interface, Spring 2008, pp. 53-57.

A. Mohamad et al., "Studies of alkaline solid polymer electrolyte and . . ." (6 pages), J. of Alloys and Compounds, 2002, v. 337: pp. 208-213.

K. Naoi et al., "Advanced Polymers as Active Materials and Electrolytes for Electrochemical Capacitors and . . ." (5 pages), Interface, Spring 2008, pp. 44-48.

K. Naoi et al., "New Materials and New Configurations for Advanced Electrochemical Capacitors" (4 pages), Interface, Spring 2008, pp. 34-37.

P. Nayak et al., "Reversible Insertion of a Trivatent Cation onto $MnO_2$ Leading . . ." (7 pages), J. of the Electrochemical Soc., 2011., v. 158(5), pp. A585-A591.

I. Plitz et al., "The design of alternative nonaqueous high power chemistries" (12 pages), Applied Physics A; 2006, v. 82, pp. 615-626.

D. Qu, "Mechanistic studies for the limitation of carbon sunercapacitor voltage" (5 pages), J. Appl.Electrochem., 2009, v. 30, pp. 867-871.

R. Service, "New 'Supercapacitor' Promises to Pack More Electrical Punch" (1 page), Science, 2006, v. 313, p. 902.

I. Sondi et al., "Preparation of highly concentrated stable dispersions of uniform silver nanaparties" (7 pages), J. of Colloid and Interface Science, 2003, v. 260, pp. 75-81.

A. Stephan, "Review on gel polymer electrolytes for lithium batteries" (22 pages), European Polymer Journal, 2006, v. 42, pp. 21-42.

H. Tien et al., "The production of graphene nanosheets decorated with . . ." (11 pages) Carbon, 2011, v. 49, pp. 1550-1560.

M. Toupin et al., "Influence of Microstucture on the Charge Storage Properties of Chemically Synthesized Manganese Dioxide" (7 pages), Chem. Mater., 2002 v. 14, pp. 3946-3952.

H. Wang et al., "$Ni(OH)_2$ Nanoplates Grown on Graphene as Advanced Electrochemical Pseudocapacitor Materials" (6 pages), J.Am.Chem.Soc., 2010, v. 132, pp. 7472-7477.

J. Wang et al., "Pseudocapacitive Contributions to Electrochemical Energy Storage in $TiO_2$ (Anatase) Nanoparticles" (7 pages), J.Phys. Chem. C, 2007, v. 111, pp. 14925-14931.

G. Wee et al., "Effect of the Ionic Conductivity on the Performance of Polyelectrolyte-Based . . ." (7 pages), Advanced Functional Materials, 2010, v. 20, pp. 4344-4350.

X. Xia et al., "Comparison of the Reactivity of $Na_xC_6$ and $Li_xC_6$ with Non-Aqueous . . ." (4 pages), Electrochem. and Solid-State Letters, 2011, v. 14(9), pp. A130-A133.

L. Yang et al., "Hierarchial Network Architectures of Carbon Fiber Paper . . ." (5 pages), Nano Letter, 2012, v.12, pp. 321-325.

H. Zhou et al., "A Self-Ordered, Crystalline—Glass, Mesoporous Nanocomposite for Use . . ." (6 pages), Angewandte Chemie, 2005, v. 44, pp. 797-802.

F. Zhou et al., "Coprecipitaion Synthesis of $Ni_xMn_{1-x}(OH)_2$ Mixed Hydroxides" (7 pages), Chmistry of Materials, 2010, v. 22, pp. 1015-1021.

J. Goodenough et al., "Challenges for Rechargeable Li Batteries" (17 pages), Chem. Mater., 2010, v. 22, pp. 587-603.

E. Lee et al., "High-Voltage, High-Energy Layered-Spinel Composite Cathodes with Superior Cycle Life for Lithium-Ion Batteries" (13 pages), Chem. Mater., 2012, v. 24, pp. 600-612.

A. Lewandowski et al., "Ionic Liquids as Electrolytes for Li-Ion Batteries—An Overview of Electrochemical Studies" (9 pages), J. of Power Sources, 2009, v. 194, pp. 601-609.

J. Miller et al., "Introduction to electrochemical capacitor technology" (8 pages), IEEE Electrical Insulation Magazine, 2010, v. 26:4, pp. 40-47.

P. Simon et al., "Materials for Electrochemical capacitors" (11 pages), Nature Materials, 2008, v. 7, pp. 845-854.

S. Tan et al., "Poly(ether amine) and cross-linked poly(propylene oxide) diacrylate thin-film polymer electrolyte . . ." (3 pages), Electrochem. Comm., 2010, v. 12, pp. 1498-1500.

D. Wang et al., "Defect-rich crystalline $SnO_2$ immobilized on graphene nanosheets . . ." (8 pages), J.of Physical Chem. C, 2012, v. 116, pp. 22149-22156.

J. Xiao et al., "High-Perfomance $LiNi_{0.5}Mn_{1.5}O_4$ Spinel Controlled by $Mn^{3+}$ Concentration and Site Disorder" (8 pages), Advanced Material, 2012, v. 24, pp. 2109-2116.

S. Gowda et al., "Conformal Coating of Thin Polymer Electrolyte Layer on Nanostructured . . ." (6 pages), Nano Letters, 2011, v. 11, pp. 101-106.

J. Kong et al., "Carbon/$SnO_2$/Carbon Core/Shell/Shell Hybrid Nanofibers . . ." (6 pages), Nanoscale, 2012, v. 4, pp. 525-530.

D. LV., "A Novel $Li_2FeSiO_4$/C Composite: Synthesis, Characterization and High Storage Capacity" (7 pages), J. of Materials Chem., 2011, v. 21, pp. 9506-9512.

M. Roberts et al., "3D Lithium Ion Batteries—from Fundamentals to Fabrication" (15 pages), J. of Materials Chem., 2011, v. 21, pp. 9876-9890.

G. Yu et al., "Solution-Processed Graphene/$MnO_2$ nanostructured Textiles for High-Perfomance . . ." (7 pages), Nano Letters, 2011, v. 11(7), pp. 2905-2911.

J. Zheng et al., "The limitaions of energy density of battery/double-layer capacitor asymmetric cells" (9 pages), J. of the Electrochem. Soc., 2003, v. 150(4), pp. A484-A492.

J. Barnes, Overview od DOE's Energy Storage R&D For Vehicles (38 pages), NDIA-MI Ground-Automotive Power & Energy Workshop, Troy, MI, Nov. 18-19, 2008.

\* cited by examiner

THREE-DIMENSIONAL SUPERCAPACITORS AND BATTERIES WITH HIGH ENERGY DENSITIES

CROSS REFERENCE TO RELATED APPLICATION

This application claims the benefit of U.S. Provisional Patent Application, Ser. No. 61/606,397, filed on 3 Mar. 2012. The co-pending Provisional Patent Application is hereby incorporated by reference herein in its entirety and is made a part hereof, including but not limited to those portions which specifically appear hereinafter.

FIELD OF THE INVENTION

This invention relates generally to energy storage and, more particularly, to electrochemical energy storage such as via specifically designed three-dimensional supercapacitors and batteries with high energy densities.

BACKGROUND OF THE INVENTION

Energy storage devices that simultaneously have or provide high energy and power densities with superior cycle life and low cost are desired or sought for use in many and various actual and potential applications including vehicle electrification, consumer electronics and other industrial products. For example, in the past two decades, Li-ion batteries (LIBs) have revolutionized portable electronic devices, and have the potential to make a great impact on vehicle electrification. Unfortunately, state-of-the-art rechargeable batteries like Li-ion batteries are typically characterized by having a low power density. Because of their low power densities, the time required to recharge a Li-ion battery can be very long, a significant problem currently having no satisfactory available solutions. Thus, in spite of their immense potential, state-of-the-art LIBs have not been able to fully satisfy or meet the needs and demands of vehicle electrification wherein there is a need and a demand for both energy and power densities higher than those offered by current technology.

Supercapacitors (SCs), also known as electrochemical capacitors or ultracapacitors, are another type of energy storage devices. While SCs typically have much higher power densities than LIBs, SCs generally have substantially lower energy densities than LIBs. Currently, there is no SC product having desirably high power density and high energy density available in the market.

In the past two decades, substantial research and investigative efforts have been directed towards improving the energy densities of both LIBs and SCs. For LIBs these efforts have included synthesis of new high-capacity, high-voltage electrode materials, nanostructure design of anodes and cathodes, and development of high voltage electrolytes. Novel battery architectures have also been investigated. In the SC arena, the efforts have included utilization of graphene to increase surface area, introduction of pseudocapacitance, use of ionic liquid electrolytes, and development of asymmetric SCs. These studies have resulted in significant advancements in energy densities of LIBs and SCs. However, to date achieving or attaining LIBs with a specific energy >240 Wh/kg and SCs with a specific energy >100 Wh/kg remains a significant challenge. Furthermore, in state-of-the-art SCs, the thickness of the electrodes is typically limited to less than 100 μm because of slow ion diffusivity.

Recently, there have been some reports of the development of what have been referred to as three dimensional LIBs. In present practice, however, these three dimensional LIBs have generally been limited to what can be perhaps more appropriately referred to as "thin films." That is, these so-called three dimensional LIBs can have large dimensions in the x-y plane, but the size in the z-direction is limited to micrometers or less. Consequently, proposed applications for this class of cells has typically been limited to uses as surface-mountable rechargeable batteries such as for applications in microelectromechanical systems (MEMS) and other small electronic devices, and termed as 3D-microbatteries.

In view of the above, there is a need and a demand for electrode architecture design such as can be applied to either or both LIBs and SCs to increase their energy densities while providing high power densities.

SUMMARY OF THE INVENTION

A general object of the invention is to provide or result in improved energy storage.

A more specific objective of the invention is to overcome one or more of the problems described above.

The present invention, in one aspect, provides a novel electrode architecture design such as can be desirably applied to either or both LIBs and SCs such as provide or result in increased energy densities while also providing high power densities. As described in greater detail below, this new electrode architecture design is sometimes hereinafter referred to as "3D electrodes", and the LIBs and SCs with such 3D electrodes are sometimes hereinafter referred to as "3D LIBs" and "3D SCs", respectively. In accordance with this new electrode architecture design, electrodes can be provided wherein the x, y and z dimensions of the electrode can each be several hundreds or thousands of micrometers in width, length and height, respectively, as may be desired for a particular application.

One more specific aspect of the invention relates to a specific three-dimensional electrode architecture for a supercapacitor and/or battery characterized by high power density and high energy density. In one particular embodiment, such a three-dimensional electrode architecture involves or includes at least one negative electrode and at least one positive electrode. The at least one negative electrode and the at least one positive electrode each have a thickness, a width and a height. Further, the at least one negative electrode and the at least one positive electrode are preferably disposed in an interpenetrating manner.

Another aspect of the invention relates to a three-dimensional supercapacitor or battery characterized by high power density and high energy density. In one particular embodiment, such a three-dimensional supercapacitor or battery includes at least one negative electrode, at least one positive electrode, an electrolyte in contact with the electrodes, and an outer insulating case. The at least one negative electrode and the at least one positive electrode each have a thickness, a width and a height, and the at least one negative electrode and the at least one positive electrode are advantageously disposed in an interpenetrating manner.

Still another aspect of the invention relates to methods for making a three-dimensional supercapacitor or battery. In one particular embodiment, one such method involves a first extrusion deposition of a first layer of a positive electrode, a negative electrode and an insulating outer case, wherein the first layer positive and negative electrodes are disposed in an interpenetrating manner and the first layer insulating outer case is disposed around the first layer interpenetrating positive and negative electrodes. The method further involves a second extrusion deposition of a second layer of a positive electrode, a negative electrode and an insulating outer case, wherein the second layer positive and negative electrodes are disposed in an interpenetrating manner and the second layer insulating outer case is disposed around said second layer interpenetrating positive and negative electrodes, and wherein the first layer and the second layer are in register one with the other. The method further includes a deposition of an electrolyte between the positive and negative electrodes. The method still further includes a final encapsulation of the three-dimensional supercapacitor or battery.

If desired and in accordance with an alternative embodiment, the deposition of an electrolyte between the positive and negative electrodes can be done during fabrication on a layer-by-layer basis.

As described further below, such methods for making a three-dimensional supercapacitor or battery can, if desired, involve or include one or more, as desired, additional depositions of a layer of a positive electrode, a negative electrode and an insulating outer case and corresponding deposition(s) of the electrolyte prior to the final encapsulation.

Other objects and advantages will be apparent to those skilled in the art from the following detailed description taken in conjunction with the appended claims and drawings.

DETAILED DESCRIPTION OF THE INVENTION

As described in greater detail below, the invention generally relates to energy storage and, more particularly, to electrochemical energy storage such as via specifically designed three-dimensional supercapacitors and batteries with high energy densities. The invention advances a new electrode architecture design wherein electrodes are provided wherein the x, y and z dimensions of the electrode can each be several hundreds or thousands of micrometers in width, length and height, respectively, as may be desired for a particular application.

Figure 1:
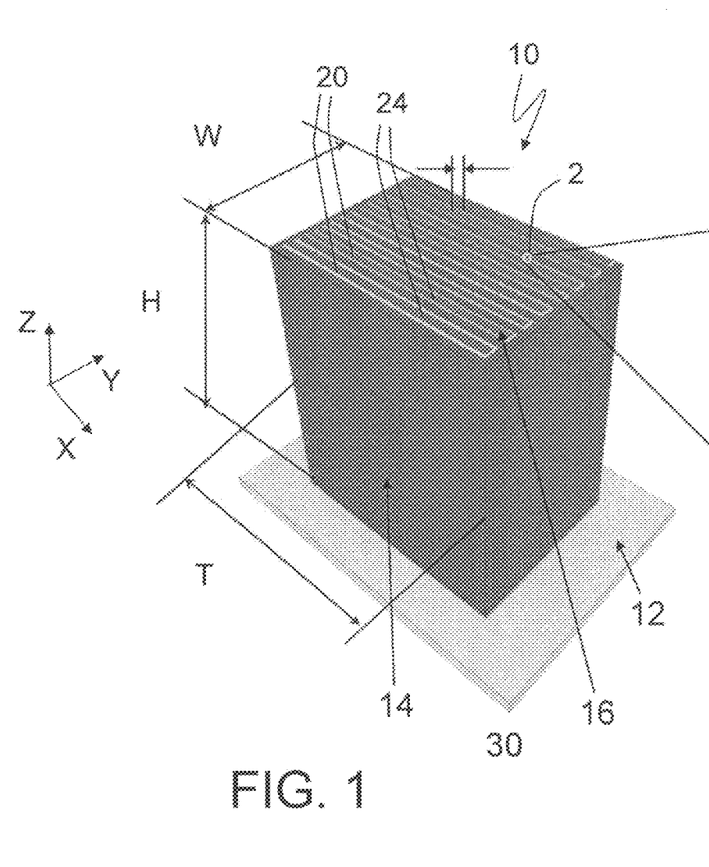
FIG. 1 is a simplified schematic of a 3D SC with ultra-thick symmetric electrodes in accordance with one embodiment of the invention.
Figure 2:
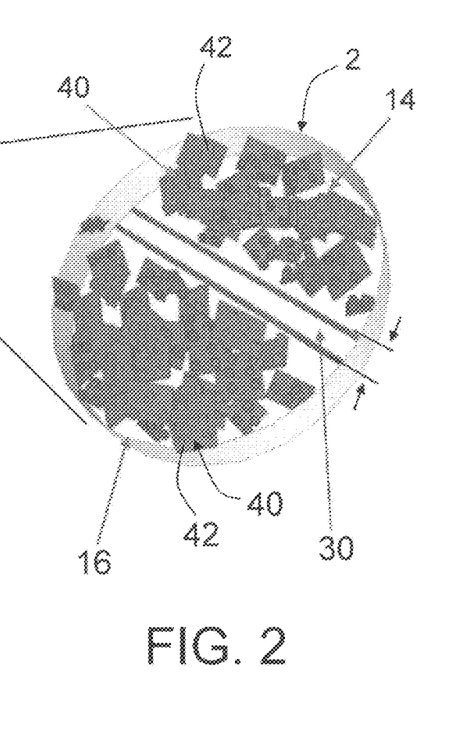
FIG. 2 is a simplified enlargement of the circled portion 2 shown in FIG. 1.
Figure 3:
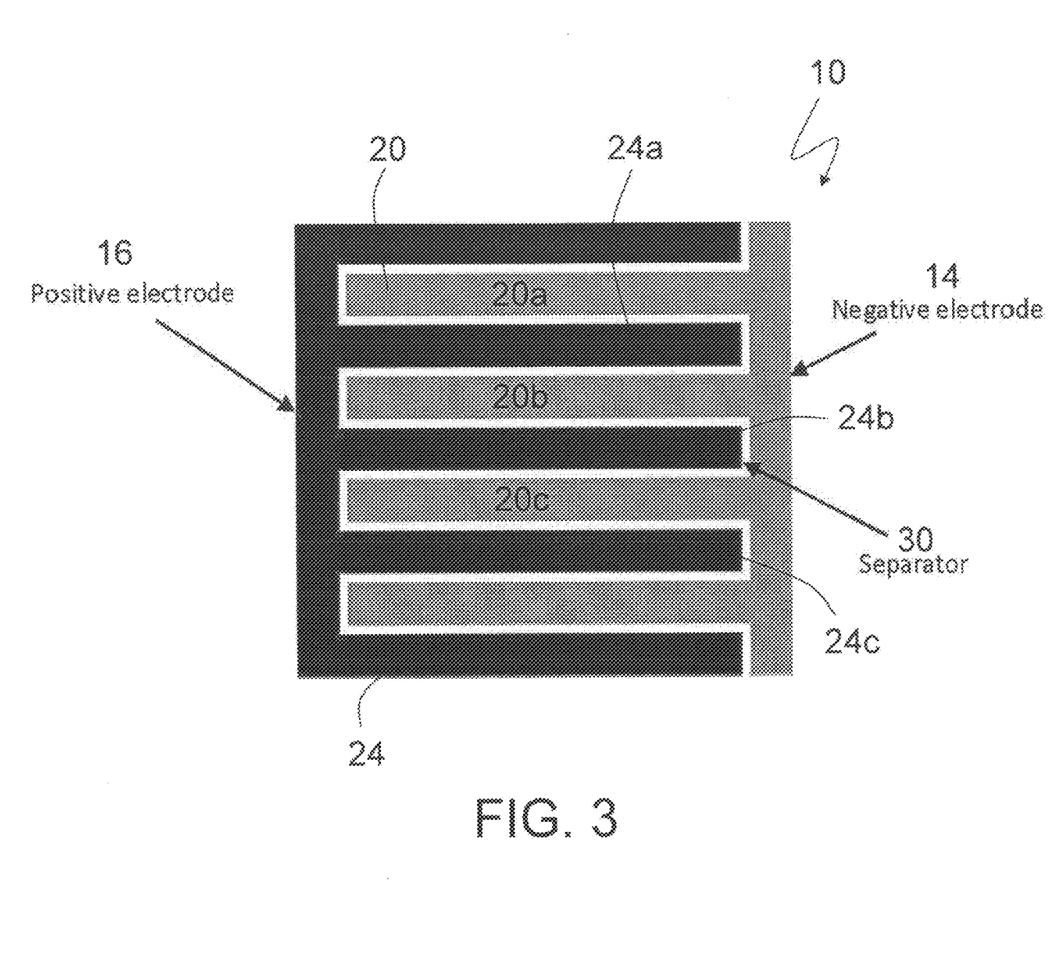
FIG. 3 is an enlarged fragmentary top view of a portion of the 3D SC shown in FIG. 1.

Turning first to FIGS. 1-3, there is illustrated a 3D SC, generally designated by the reference numeral 10, in accordance with one preferred embodiment of the invention, and/or component parts or portions thereof.

The 3D SC 10 can be fabricated or made, such as upon any suitable work surface, such as here identified as a substrate 12, such as in the form of an aluminum plate, for example. Upon the substrate 12 there is disposed a negative electrode 14 and a positive electrode 16. As shown, the negative electrode and the positive electrode each have a x-axis thickness "T", a y-axis width "W" and a z-axis height "H".

The negative electrode 14 and the positive electrode 16 of the 3D SC 10 exhibit or are characterized by an interpenetrating positive and negative electrode architecture. For example, the negative electrode 14 is shown as including a plurality of negative electrode branches or fingers, generally designated by the reference numeral 20. Similarly, the positive electrode 16 is shown as including a plurality of positive electrode branches or fingers, generally designated by the reference numeral 24. Turning specifically to FIG. 3, the negative electrode branches or fingers 20 and the positive electrode branches or fingers 24 are disposed in an interpenetrating manner such as wherein a positive electrode branch or finger 24a is disposed between two negative electrode branches or fingers 20a and 20b and/or wherein a negative electrode branch or finger 20c is disposed between two positive electrode branches or fingers 24b and 24c, for example.

Thus, in one simple embodiment, a 3D SC or a 3D battery in accordance with the invention can comprise a negative or positive electrode composed of two branches appropriately sandwiched about a single branch of the other of the negative and positive electrode.

Those skilled in the art and guided by the teachings herein provided, however, will understand and appreciate that the number of electrode branches selected for a particular embodiment can be significantly application-dependent. For example, electrodes with 100 or more branches are envisioned for particular applications such as vehicular transportation.

In practice, the width of each electrode branch or finger can typically be in a range of about 50 µm to about 400 µm. In accordance with certain preferred embodiments, the width of electrode branches or fingers is in a range of about 100 µm to about 300 µm. Further, in accordance with certain preferred embodiments, the width of electrode branches or fingers is in a range of about 150 µm to about 250 µm, with a width of around 200 µm being thought to be particularly desirable.

Disposed between the negative electrode 14 and the positive electrode 16 is a separator 30. As will be described in greater detail below, due to the nature of interpenetrating anodes and cathodes, planar separators cannot be used for 3D SCs and 3D batteries with interpenetrating anodes and cathodes.

The subject 3D electrode architecture allows the electrode thickness to be very large to increase the energy density. In contrast, the electrode thickness of typical state-of-the-art SCs is generally limited to about 100 µm because of the slow ion diffusivity issue. With the subject 3D electrode architecture, however, the electrode thickness of 3D SCs can be very large (e.g., several thousand micrometers thick) because slow ion diffusion can take place laterally. With the novel architecture of the 3D electrodes shown in FIG. 1, the distance for ion diffusion laterally is advantageously only about half of the width of each electrode branch. Further, the height and the total width of the electrodes (such as shown in FIG. 1 and such through the inclusion of additional interpenetrating electrode branches) can be made as large as desired typically up to a point at which electronic conduction becomes rate limiting.

FIG. 2 is a magnified or enlarged view of the circled portion 2 shown in FIG. 1. That is, FIG. 2 is a top view of the separator 30 filled with electrolyte and the electrodes 14 and 16 each made of a graphene nanosheet (GN)/oxide assembly infiltrated with the electrolyte. Graphene nanosheets (GNs) are designed by the reference numeral 40 and their surfaces are bonded with or otherwise appropriately incorporate nano-oxide particles, designated by the reference numeral 42, such as $MnO_2$ nanoparticles (sometimes termed herein as a $GN/MnO_2$ assembly).

Thus, another aspect of the 3D SCs disclosed herein lies in the design of the electrode microstructure along with associated chemistry. As shown above, 3D SC electrodes can be composed of a graphene nanosheet (GN) network which incorporate or are bonded with $MnO_2$ nanoparticles. It is known that GNs have among the highest intrinsic capacitance (21 $\mu F/cm^2$) among all carbonaceous materials. In spite of this advantage, GNs have a high tendency to restack themselves during all phases of GN preparation and electrode fabrication processes, leading to the loss of the surface area for the formation of electrical double-layer (EDL) charges. However, recent work reveals that if the restacking problem is overcome such as by using curved graphene, a SC with a specific energy density (85.6 Wh/kg) comparable to that of a Ni metal hydride battery (40-100 Wh/kg) can be constructed.

For example, a 3D SC in accordance with the invention can be made of activated carbon (such as available from Nesscap Energy, Inc., Korea) with only one pair of positive and negative electrodes in dimensions of 150 mm×150 mm×150 mm without getting into the problem of charge/discharge rates limited by the electronic conductivity. Such a single 3D SC contains 667 pairs of positive/negative electrode branches and can have a total capacitance of 210,100 F if we assume that:
  (a) each pair of positive/negative electrode branches is 225 $\mu m$ thick (two 100-$\mu m$ thick electrodes+one 25-$\mu m$ separator, FIG. 1),
  (b) AC capacitance=100 F/g in an organic electrolyte with an operation voltage 2.7 V, and
  (c) carbon density=0.7 $g/cm^3$.

A single SC with such a high capacitance is completely inconceivable under the current state of the art. Instead, to obtain such a storage capacity (210,100 F), the state-of-the-art technology requires a parallel connection of 667 SCs each of which has a capacitance of 315 F. Since assembled SCs, like LIBs, contain current collectors, separators, electrolyte, binder, connectors, and packaging, in addition to the electrodes, the energy density of an assembled device is typically lower than that of the active electrode material by a factor of 3 to 4. With the design of 3D electrode architecture herein described and provided, however, one can eliminate several hundreds of current collectors, connectors, insulators and packaging materials. As a result, the energy density of an assembled 3D SC is lower than that of the active electrode materials by a factor of only 2 or less, rather than by a factor of 3 to 4 as is typical with conventional electrode designs. Therefore, with the subject 3D SC design, one can convert the high energy density based on the active electrode materials into a comparable high energy density for an assembled device.

Thus, a first level of innovation involved in the subject development relates to an electrode architecture having 3D interpenetrating negative and positive electrodes, which allows electrode thicknesses to be very large to increase the energy density. In contrast, as discussed above, the electrode thickness of the state-of-the-art SCs is typically limited to less than 100 $\mu m$ because of the slow ion diffusivity issue.

Fabrication

The 3D SC shown in FIG. 1 can desirably be fabricated layer by layer using a multi-material micro-extrusion method. Such multi-material micro-extrusion is related or similar to (slurry) micro-extrusion (SME) such as has been previously described, for example, in relation to dental restorations, such as in:
  1. J. Wang, L. Shaw, and T. Cameron, "Solid Freeform Fabrication of Permanent Dental Restorations via Slurry Micro-Extrusion," *J. Am. Ceram. Soc.*, 89 [1] 346-349 (2006) and
  2. J. Wang and L. Shaw, "Rheological and Extrusion Behavior of Dental Porcelain Slurries for Rapid Prototyping Applications," *Mater. Sci. Eng.*, 397A, 314-321 (2005).

Figures 4A, 4B:
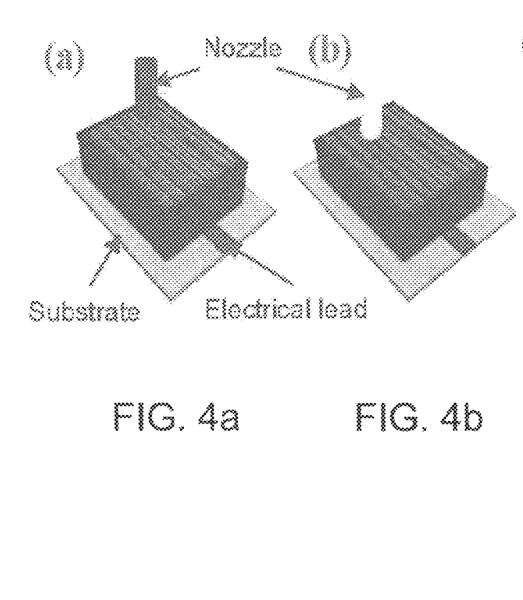
FIGS. 4a-4e are simplified schematics showing significant sequential processing steps in a method for making a 3D SC in accordance with one embodiment of the invention.
Figure 4C:
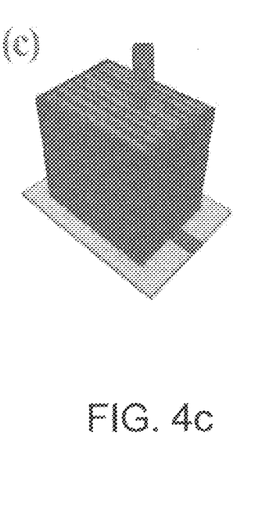
Figure 4D:
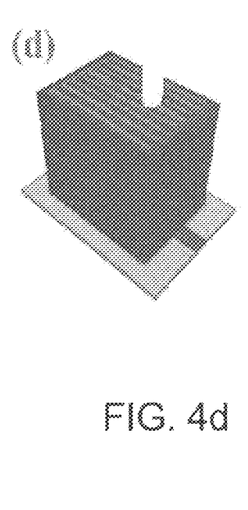
Figure 4E:
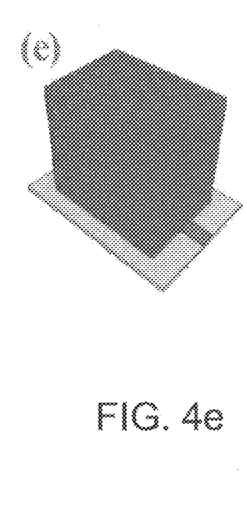

As shown in FIGS. 4a-4e, an entire 3D SC and its packaging can be fabricated with one multi-material micro-extrusion machine directly from a computer model without part-specific tooling and human intervention. For example, using the example materials listed in Table 1, one can fabricate 3D SCs via a multi-material micro-extrusion method, as follows:

Specifically, 3D electrodes, e.g., a slurry of mixed graphene nanosheet (GN)+10 wt % carbon black+10 wt % polyvinylidene fluoride (PVDF) in N-Methyl-2-pyrrolidone (NMP), and an outer insulating case made of acrylics can be deposited first using two separate multi-material micro-extrusion nozzles (FIG. 4a). This can then be followed by depositing a gel electrolyte/separator, such as a 5.5M KOH in poly(vinyl alcohol), between the positive and negative electrodes from a third multi-material micro-extrusion nozzle (FIG. 4b). This deposition process can be repeated as many times as desired to fabricate the 3D SC layer by layer, with adjacent layers and the components thereof generally appropriately aligned or in register one with the other, until the desired height of the 3D SC is reached (FIGS. 4c & 4d). At this point a liquid electrolyte (such as a 5.5M KOH aqueous electrolyte) can then be infiltrated into all of the electrodes and/or electrode branches using another multi-material micro-extrusion nozzle before a final encapsulation of the 3D SC (FIG. 4e). Alternatively, if preferred, liquid electrolyte can be added to infiltrate the electrodes and/or electrode branches on a layer-by-layer basis. In practice, a single infiltration with the electrolyte may be faster and/or simpler and thus preferred versus a layer-by-layer infiltration.

For 3D SCs using organic electrolytes or ionic liquids (ILs), additional steps may be desired or required prior to final encapsulation. For example, such processing may desirably additionally entail:
  (i) drying the electrode/separator assembly fabricated via multi-material micro-extrusion in a vacuum oven,
  (ii) filling the desired organic or IL electrolyte to the assembly, and
  (iii) encapsulate the 3D SC under a controlled atmosphere.

Further, while in such layer-by-layer fabrication, as described above, the thickness of each individual layer typically scales with the nozzle size, layers commonly may have a thickness in a range of about 50 $\mu m$ to about 400 $\mu m$, for example, when nozzles with diameters of 50 $\mu m$ to 400 $\mu m$ are used.

Still further, those skilled in the art and guided by the teachings herein provided will appreciate that desirable increases in fabrication rates can be realized such as through the employment of micro-extrusion processing of pastes and/or thick slurries such as to favorably enhance the economic viability of the subject processing.

TABLE 1

Examples of materials for various components of 3D SCs

| Components | Composition of the Component |
|---|---|
| Examples of electrodes | Graphene nanosheet (GN)-based electrode 1: GNs + 10 wt % carbon black + 10 wt % polytetrafluoroethylene (PTFE) GN-based electrode 2: GNs + 10 wt % carbon black + 10 wt % polyvinylidene fluoride (PVDF) Hydroxide/GN-based electrodes: $Ni(OH)_2$ nanoplates deposited on the surface of GNs + 10 wt % PTFE Activated carbon (AC)-based electrodes: ACs + 10 wt % PVDF |

TABLE 1-continued

Examples of materials for various components of 3D SCs

| Components | Composition of the Component |
|---|---|
| Examples of Electrolytes | Aqueous electrolyte: a 5.5M KOH<br>Organic electrolyte: 1M tetraethyl-ammonium tetrafluoroborate (TEA BF$_4$) in the ethylene carbonate (EC) + dimethyl carbonate (DMC) mixture |
| Examples of Separators | Gel electrolytes: (1) poly(vinyl alcohol)-based, and (2) cardanyl tauramide-based electrolytes |
| Outer case | Acrylics |

Those skilled in the art and guided by the teachings herein provided will understand and appreciate that the 3D SC concepts depicted in FIGS. 1-4 are also generally applicable to batteries, particularly LIBs. In the case of LIBs, the cathode (i.e., the positive electrode) can desirably be made from one or more various active materials such as $LiCoO_2$, $LiMn_2O_4$, $LiFePO_4$ and $LiMn_{1.5}Ni_{0.5}O_4$, for example. For example, one of these active materials in a powder form can be mixed with 10 wt % carbon black and 15 wt % PVDF to make a cathode slurry. This cathode slurry can then be deposited via multi-material micro-extrusion to fabricate an interpenetrating cathode such as herein described. Similarly, an anode (i.e., the negative electrode) can desirably be made from one or more various active materials such as $Li_4Mn_5O_{12}$, $Li_4Ti_5O_{12}$, C or Si and such as with the addition of PVDF or PTFE as a binder. If an oxide is chosen as the active material, then the oxide can, if desired be preferably mixed with carbon black and the binder to prepare the anode slurry, which can then be deposited via multi-material micro-extrusion to fabricate the interpenetrating anode.

As identified above, because of the nature of interpenetrating anodes and cathodes, planar separators cannot generally be used for 3D SCs and 3D batteries with interpenetrating anodes and cathodes. Thus, in a preferred practice of the invention, electrolytes that can combine the electrolyte and separator into a single component and be extrudable via multi-material micro-extrusion processing as well as being capable of in-situ formation of gels or polymerization to form a solid film following, preferably immediately following micro-extrusion, will be desired. One such electrolyte is a 2:1 blend of polyetheramine (PEA) and cross-linked oligomeric polypropylene oxide (PPO)-diacrylate with lithium bis(trifluoromethanesulfonyl)imide (LiTFSI). In this polymer electrolyte, PEA can act as a surfactant on Li-battery electrodes so that the polymer electrolyte experiences good contact with the complex surface of the electrodes, while the short chain PPO diacrylate with an initiator can be cross-linked in situ during micro-extrusion under UV exposure to provide mechanical stability to the separator. Further, the presence of LiTFSI can advantageously offer desired or required ionic conductivity of the combined electrolyte and separator.

It is to be understood that while the broader practice of the invention is not necessarily limited by or to the inclusion of separators of a specific or particular thickness, in accordance with certain preferred embodiments, separators in a thickness in a range of about 10 µm to about 100 µm are believed desirable, with separators having a thickness in a range of about 20 µm to about 30 µm and, in particular a thickness of about 25 µm being especially preferred.

In such 3D battery fabrication, similar to the fabrication of 3D SCs, the anode, cathode, electrolyte/separator, and outer case can be micro-extruded layer by layer first. After a desired height has been reached, liquid electrolytes (such as ethylene carbonate (EC) doped with LiTFSI) can be infiltrated into all of the anode and cathode branches before final encapsulation of the battery.

A 3D SC or 3D battery such as shown and/or described above can, if desired, be appropriately and simply modified to include one or more additional features such as air or liquid cooling channels such as may be desired such as to mitigate thermal management issues, for example.

Figure 5:
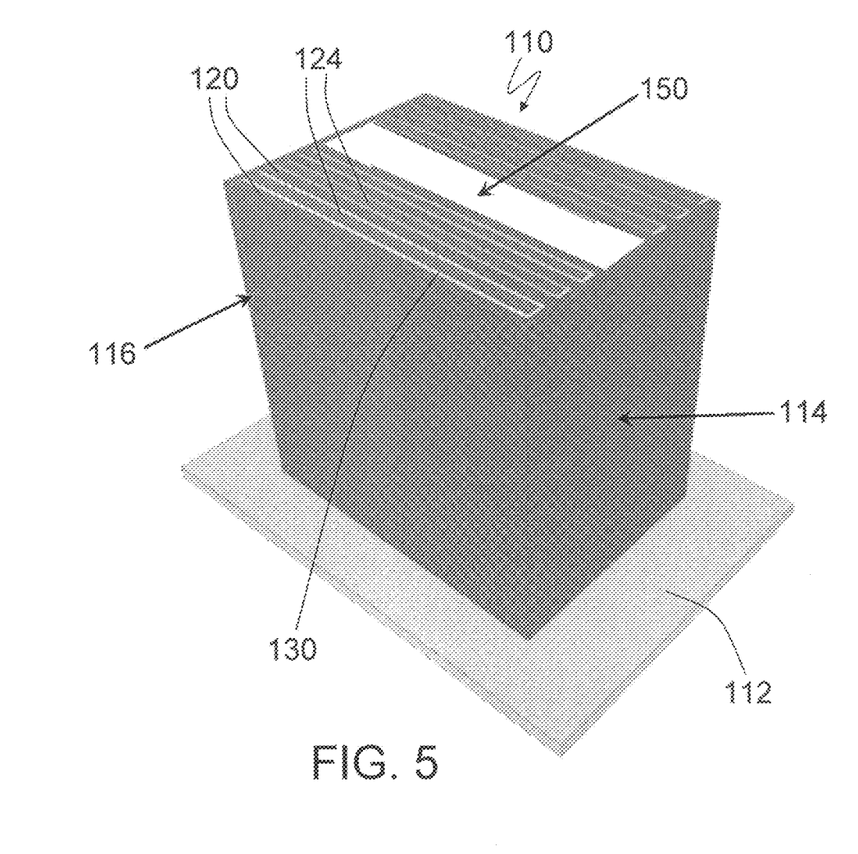
FIG. 5 is a simplified schematic of a 3D SC similar to that shown in FIG. 1 but now in accordance with another preferred embodiment of the invention.

For example, FIG. 5 shows a 3D SC in accordance with another embodiment of the invention and generally designated by the reference numeral 110. The 3D SC 110 is in many respects similar to the 3D SC 10 described above. For example, similar to the 3D SC 10, the 3D SC 110 is fabricated on a substrate 112 upon which is disposed a negative electrode 114 and a positive electrode 116, with a separator 130 appropriately disposed therebetween. As with the 3D SC 10, the negative electrode 114 and the positive electrode 116 of the 3D SC 110 exhibit or are characterized by an interpenetrating positive and negative electrode architecture. For example, the negative electrode 114 is shown as including a plurality of negative electrode branches or fingers, generally designated by the reference numeral 120. Similarly, the positive electrode 116 is shown as including a plurality of positive electrode branches or fingers, generally designated by the reference numeral 124.

The 3D SC 110 perhaps most significantly differs from the 3D SC 10 described above in that it includes or incorporates a built-in or integral air or liquid cooling channel 150.

Since, as described above, 3D SCs can desirably be fabricated layer by layer via multi-material micro-extrusion processing, such air or liquid cooling channels can be appropriately positioned or located at any desired location within a 3D SC structure and the number of such channels can be adjusted as needed. Furthermore, if desired, active cooling such as via forced air or flowing liquid, for example, can be used during high-current charge. Finally, such inclusion of air or liquid channels will lead to little increase in fabrication costs and no penalty in energy density.

As 3D SCs and 3D batteries in accordance with the invention can be desirably fabricated layer by layer using multi-material micro-extrusion processing, the air or liquid cooling channels can be located at selected desired locations within 3D device structure and the number of such cooling channels can be adjusted as needed. Furthermore, active cooling with forced air or flowing liquid can be used during high-current charge. Finally, the inclusion of air or liquid channels will in general lead to little increase in fabrication costs and relatively no penalty in energy density.

Such 3D SCs and LIBs with both high energy and high power densities can enable many industries in the areas of electric cars, portable electronics, security cards, on-demand power, medical devices for observation and drug delivery, remote sensors, military devices, etc.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1

This example highlights the formulation of slurries that can be used to make electrodes of 3D SCs via multi-material micro-extrusion processing.

A key factor for successful slurry micro-extrusion (SME) is good dispersion and uniform mixing of various materials used to make electrodes. Thus, this example used slurry sedimentation enhanced by filtration to identify suitable slurry formulations for achieving good dispersion and uniform mixing. In this example, the slurry composition employed was graphene nanosheets (GNs)+10 wt % carbon black+10 wt % polytetrafluoroethylene (PTFE) in a solvent containing 90 vol. % dimethylformamide (DMF)+10 vol. % deionized water with pH=10. Here, the 10 wt % PTFE served as a binder, whereas the 10 wt % carbon black nanoparticles served the purpose of separating GNs to prevent them from restacking, thereby leading to a high utilization of the very high surface area of GNs and thus high capacitance.

Figure 6:
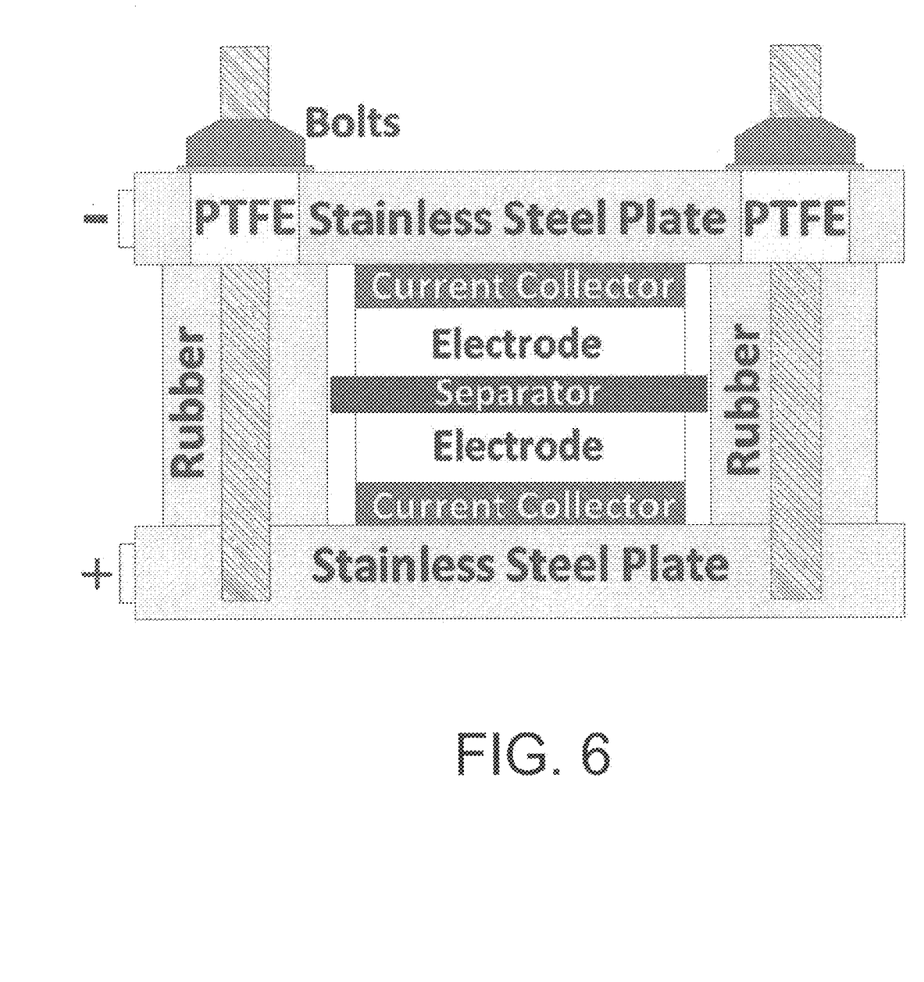
FIG. 6 is a schematic of representation of the SC assembly used in Example 1.
Figure 7:
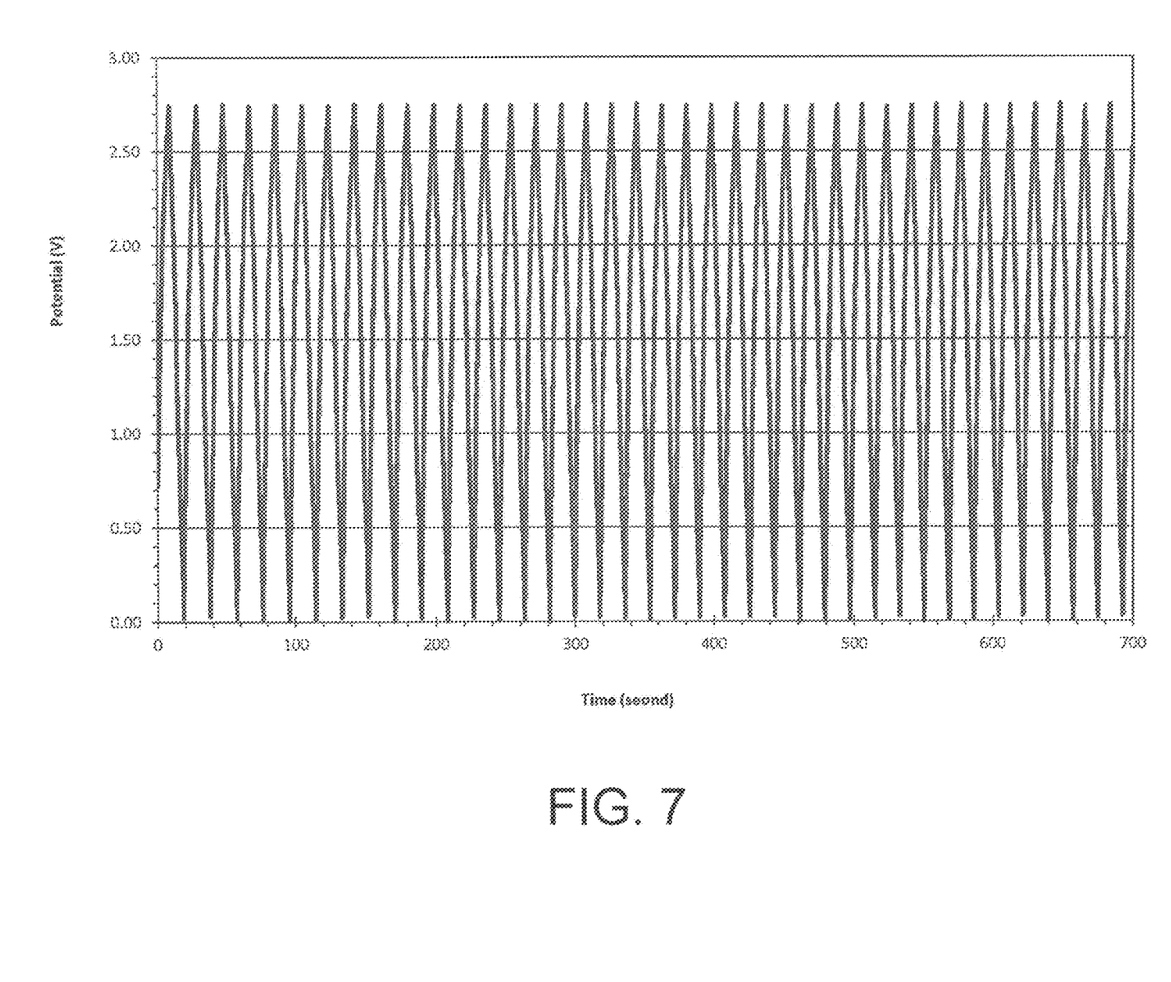
FIG. 7 is a graphical representation of Potential versus Time showing the galvanostatic charge/discharge cycling curves with a current density of 13.3 A/g for the SC made of GN-based electrodes of Example 1.

A thin electrode film with uniform thickness and composition made from this process was typically 30 to 100 µm thick, depending on the solid loading in the slurry. The so-produced films were then dried in a vacuum oven at 120° C. for 12 hours before being assembled to form a conventional supercapacitor (SC). FIG. 6 schematically shows the assembled SCs. FIG. 7 shows the measurements of galvanostatic charge/discharge curves for the SCs constructed with the GNs+10 wt % carbon black+10 wt % PTFE electrodes and a 3M triethylmethylammonium tetrafluoroborate (TEMA $BF_4$) in propylene carbonate (PC) organic electrolyte. In these SCs, microporous separators composed of polypropylene (PP) membranes with a thickness of 25 µm from Celgard, LLC, North Carolina were used. The specific capacitance of these SCs were calculated from the galvanostatic cycling measurements with the aid of Eq. (1)

$$C = \frac{I\Delta t}{m\Delta V} \quad (1)$$

where I is the applied current for charge/discharge, m is the mass of two electrodes, $\Delta V$ is the voltage change of the discharge curve, and $\Delta t$ is the time required for the voltage change. The specific energy of these SCs, E, based on the weight of both electrodes was computed from the double layer capacitance, C, and the square of the applied voltage, $V^2$:

$$E = \tfrac{1}{2} CV^2 \quad (2)$$

The results from these calculations are summarized in Table 2. The specific capacitance and specific energy obtained are similar to those obtained by other groups, indicating that the slurry formulation investigated is appropriate for multi-material micro-extrusion processing to make 3D SCs.

TABLE 2

Properties of the SCs made of GN-based electrodes*

| Current density (A/g) | Specific power (W/kg) | Specific capacitance (F/g) | Specific energy (Wh/kg) |
|---|---|---|---|
| 6.7 | 8,645 | 103.2 | 26.2 |
| 13.3 | 17,290 | 89.8 | 22.4 |
| 53.3 | 69,290 | 83.0 | 21.0 |

*The current density is based on the weight of one electrode, and so is the specific power. The specific capacitance is the electrode capacitance, whereas the specific energy is based on the weight of both electrodes.

Example 2

This theoretical example computes the energy densities of various supercapacitors with different cell voltages and specific capacitances. The computational results are summarized in Table 3. Three different energy densities are compared in this table. The first is the specific energy based on active electrode materials only, calculated using Eq. (2). The second is the specific energy of assembled SC devices, which is typically lower than that based on active electrode materials by a factor of 3 to 4. The third is the specific energy of assembled 3D SC devices, which is lower than that based on active electrode materials by a factor of 2 or less.

From Table 3 it can be seen that the subject 3D electrode architecture offers significant advantage over conventional SC designs. Even for supercapacitors with graphene nanosheets (GNs) as electrodes (i.e., specific capacitance=150 F/g for both negative and positive electrodes), the specific energy of assembled 3D SCs is 130 Wh/kg, comparable with the specific energy of LIBs. However, this is not the case for the conventional SC design which only provides the specific energies lower than 90 Wh/kg, below the specific energy of LIBs. For pseudocapacitors with one electrode having the specific capacitance=700 F/g, the specific energy of 3D SCs becomes 214 Wh/kg or higher, comparable with LIBs. For pseudocapacitors with both electrode having the specific capacitance=700 F/g, the specific energy of 3D SC can be 389 or 607 Wh/kg, depending on the cell voltage. These energy densities are much higher than even state-of-the-art LIBs.

TABLE 3

Comparison in energy densities of various pseudocapacitors including the 3D SC design

| | Specific capacitance of electrodes (F/g) | | | |
|---|---|---|---|---|
| | 150/700* | 700/700 | 700/700 | 150/150 |
| Cell voltage (V) | 5 (3 + 2) | 4 (2 + 2) | 5 (2 + 3 or 3 + 2)# | 5 (2 + 3) |
| Specific energy based on active electrode materials (Wh/kg) | 429 | 778 | 1,215 | 260 |
| Specific energy of assembled SC devices (Wh/kg) | 107-143 | 194-259 | 303-405 | 65-86 |
| Specific energy of assembled 3D SC devices (Wh/kg) | >214 | >389 | >607 | >130 |

*150/700 stands for 150 F/g at the positive electrode (e.g., a graphene nanosheet electrode) and 700 F/g at the negative electrode (e.g., a nano-oxide electrode) for asymmetric SCs. The same rule applies to 700/700 and 150/150.
5 (2 + 3 or 3 + 2) means that the cell voltage of 5 V is achieved via either a 2-volt change in the positive electrode plus a 3-volt change in the negative electrode or a 3-volt change in the positive electrode plus a 2-volt change in the negative electrode. The same rule applies to 5 (3 + 2), 4 (2 + 2) and 5 (2 + 3).

The 3D SCs, such as disclosed herein, can desirably simultaneously provide or result in high power and high energy densities. As will be appreciated by those skilled in the art and guided by the teachings herein provided such 3D SCs can be characterized as exhibiting battery-like capacity and SC-like rate performance and can thus provide major advancements in energy storage technology and desirably impact many industries and fields, such as including for example and without unnecessary limitation, electric vehicles, portable electronics, security cards, on-demand power, medical devices for monitoring and drug delivery, remote sensors, military devices and the like.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A three-dimensional electrode architecture for a supercapacitor and/or battery characterized by high power density and high energy density, the three-dimensional electrode architecture comprising:
   at least one negative electrode;
   at least one positive electrode;
   said at least one negative electrode and said at least one positive electrode each having a thickness, a width and a height, and wherein the thickness, width and height of the at least one negative electrode and the at least one positive electrode are each at least several thousand micrometers, and
   said at least one negative electrode and said at least one positive electrode are disposed in an interpenetrating manner.

2. The three-dimensional electrode architecture of claim 1 wherein at least one of said at least one negative electrode and said at least one positive electrode comprises at least two branches disposed on opposite sides of the other of said at least one negative electrode and said at least one positive electrode.

3. The three-dimensional electrode architecture of claim 2 wherein said electrode branches are each about 50 μm to about 400 μm thick.

4. The three-dimensional electrode architecture of claim 3 wherein at least one of said electrode branches is about 150 μm to about 250 μm thick.

5. The three-dimensional electrode architecture of claim 1 wherein said at least one negative electrode and said at least one positive electrode each comprises a plurality of branches and wherein at least a plurality of said negative electrode branches are individually disposed in an interpenetrating manner with branches of said positive electrode.

6. The three-dimensional electrode architecture of claim 1 additionally comprising a separator disposed between said at least one negative electrode and said at least one positive electrode.

7. The three-dimensional electrode architecture of claim 6 wherein said separator is about 10 μm to about 100 μm thick.

8. The three-dimensional electrode architecture of claim 6 wherein said separator comprises a gel electrolyte separator.

9. The three-dimensional electrode architecture of claim 1 wherein at least one of said at least one negative electrode and said at least one positive electrode comprises a material selected from the group of activated carbon, graphene and graphene with oxide particles.

10. A three-dimensional supercapacitor or battery characterized by high power density and high energy density, the three-dimensional supercapacitor or battery comprising:
    at least one negative electrode;
    at least one positive electrode;
    wherein said at least one negative electrode and said at least one positive electrode each have a thickness, a width and a height, and wherein the thickness, width and height of the at least one negative electrode and at least one positive electrode are at least several thousand micrometers, and said at least one negative electrode and said at least one positive electrode are disposed in an interpenetrating manner;
    an electrolyte in contact with the electrodes; and
    an outer insulating case.

11. The three-dimensional supercapacitor or battery of claim 10 additionally comprising at least one air or liquid cooling channel.

12. The three-dimensional supercapacitor or battery of claim 10 additionally comprising at least one forced air or flowing liquid cooling channel.

13. The three-dimensional supercapacitor or battery of claim 10 wherein at least one of said at least one negative electrode and said at least one positive electrode comprises at least two branches disposed on opposite sides of the other of said at least one negative electrode and said at least one positive electrode.

14. The three-dimensional supercapacitor or battery of claim 13 wherein said electrode branches are each about 50 μm to about 400 μm thick.

15. The three-dimensional supercapacitor or battery of claim 10 wherein said at least one negative electrode and said at least one positive electrode each comprises a plurality of branches and wherein at least a plurality of said negative electrode branches are individually disposed in an interpenetrating manner with branches of said positive electrode.

16. A method for making the three-dimensional supercapacitor or battery of claim 10, said method comprising:
    a first extrusion deposition of a first layer of a positive electrode, a negative electrode and an insulating outer case, wherein the first layer positive and negative electrodes are disposed in an interpenetrating manner and the first layer insulating outer case is disposed around said first layer interpenetrating positive and negative electrodes;
    a second extrusion deposition of a second layer of a positive electrode, a negative electrode and an insulating outer case, wherein the second layer positive and negative electrodes are disposed in an interpenetrating manner and the second layer insulating outer case is disposed around said second layer interpenetrating positive and negative electrodes, and wherein the first layer and the second layer are in register one with the other;
    a deposition of an electrolyte between the positive and negative electrodes; and
    a final encapsulation of the three-dimensional supercapacitor or battery.

17. The method of claim 16 wherein said deposition of an electrolyte between the positive and negative electrodes comprises:
    a first deposition of an electrolyte between the positive and negative electrodes of said first layer prior to said second extrusion deposition and, subsequent to said second extrusion deposition, a second deposition of an electrolyte between the positive and negative electrodes of said second layer.

18. The method of claim 16 wherein at least one of said at least one negative electrode and said at least one positive electrode comprises at least two branches disposed on opposite sides of the other of said at least one negative electrode and said at least one positive electrode.

19. The method of claim 16 wherein at least one of said first and second extrusion depositions comprises a multi-material micro-extrusion.

20. The method of claim 16 wherein said at least first extrusion deposition of a first layer of a positive electrode, a negative electrode and an insulating outer case comprises fabricating at least one of said positive and said negative electrodes via a micro-extrusion of a paste or slurry.

21. The three-dimensional electrode architecture of claim 1 wherein the thickness, width and height of the at least one negative electrode and the at least one positive electrode are each at least ten thousand micrometers.

22. The three-dimensional supercapacitor or battery of claim 10 wherein the thickness, width and height of the at least one negative electrode and the at least one positive electrode are each at least ten thousand micrometers.

* * * * *